United States Patent
Yamada et al.

[11] Patent Number: 6,166,828
[45] Date of Patent: Dec. 26, 2000

[54] CLEARING INK JET NOZZLES DURING PRINTING

[75] Inventors: Akitoshi Yamada; Hiromitsu Hirabayashi, both of Irvine, Calif.

[73] Assignee: Canon Kabushiki Kaisha, Tokyo, Japan

[21] Appl. No.: 08/901,662

[22] Filed: Jul. 28, 1997

[51] Int. Cl.⁷ .............. B41B 15/00; B41J 15/00; B41J 2/205; B41J 2/165

[52] U.S. Cl. .............. 358/1.8; 358/1.4; 358/1.9; 347/15; 347/24; 347/35; 347/43

[58] Field of Search .................... 395/108, 109, 395/104; 399/31, 33, 34, 38; 400/279, 320, 322; 347/5–15, 20–23, 29–33, 40–44, 47, 54–55, 66, 24, 35; 358/1.8, 1.9, 1.4

[56] References Cited

U.S. PATENT DOCUMENTS

| | | | |
|---|---|---|---|
| 5,427,461 | 6/1995 | Hirai et al. | 400/279 |
| 5,477,246 | 12/1995 | Hirabayashi et al. | 347/12 |
| 5,500,661 | 3/1996 | Matsubara et al. | 347/41 |
| 5,559,535 | 9/1996 | Otsuka et al. | 347/14 |
| 5,577,136 | 11/1996 | Tanioka et al. | 382/270 |
| 5,659,342 | 8/1997 | Lund et al. | 347/35 |
| 5,696,542 | 12/1997 | Matsubara et al. | 347/12 |
| 5,708,463 | 1/1998 | Hirabayashi et al. | 347/43 |
| 5,751,304 | 5/1998 | Hirabayashi et al. | 347/17 |
| 5,806,997 | 9/1998 | Kawanabe | 400/124.01 |

*Primary Examiner*—Edward L. Coles
*Assistant Examiner*—Twyler Lamb
*Attorney, Agent, or Firm*—Fitzpatrick, Cella, Harper & Scinto

[57] ABSTRACT

In an ink jet printer having plural ink ejection nozzles on a print head, additional firings are added for each print element so as to ensure that the ink jet nozzles remain unclogged during printing. The extra firings are effected directly onto the recording medium in a controlled way so as to ensure that printout quality is not adversely affected. Particularly, extra firings of lighter-colored inks are effected over regions of darker colored ink, and any color shift caused thereby is compensated by changing printout data in the surrounding region.

73 Claims, 9 Drawing Sheets

FIG. 11

CLEARING INK JET NOZZLES DURING PRINTING

BACKGROUND OF THE INVENTION

1. Field of the Invention

The present invention relates to ink jet or bubble jet printing by which an image is formed through ejection of ink droplets from the nozzles of plural print elements on a print head, and more particularly to ensuring that the print elements do not become clogged and ensuring that the free flow of ink through such nozzles is maintained.

2. Description of the Related Art

In conventional ink jet or bubble jet printing (collectively, "ink jet"), an image is formed by ejection of ink in droplets formed through piezoelectric or resistance heating through a plurality of fine nozzles. As is known, and due to the fineness of such nozzles, it is easy for the nozzles to become clogged, thereby restricting the flow of ink therethrough and adversely affecting the print quality. As a consequence, various techniques are known for preventing clogging of the nozzles. Such techniques include capping of the nozzle during quiescent periods of the printer (i.e., in the absence of a printing operation), purging ink from the nozzle by applying suction to the nozzle so as to draw ink out through all such nozzles, and wiping the face of the print head containing such nozzles so as to remove back-scattered ink and paper particles and residual dried ink and debris.

Generally speaking, mechanisms for performing such unclogging and clogging-preventative operations are disposed at extreme left- or right-ends of a printing platen against which the print head operates. Accordingly, conventional ink jet printers will have a capping/purging station at a left-most edge of a printing platen, at an area which will not be blocked while a recording medium (such as a paper sheet) is on the platen. During a printing process, the printing head will periodically be moved to the capping/purging station to purge the nozzles by suction, so as to ensure that the print elements do not become clogged.

Recently, it has become increasingly popular to print on a larger variety of recording mediums, such as large-format A-3 size paper, T-shirt transfer materials, and the like. At the same time, it is also desirable to decrease the overall "footprint" of the printer, i.e., to decrease the size of the printer itself. However, since the capping/purging station must be located outside the path of the recording medium, increasing the size of recording mediums has necessarily caused an increase in size of the printer.

Recently, it has been proposed to dispose the capping/purging station beneath the feed path of the recording medium, so as to decrease the footprint of the printer. However, since the capping/purging station is beneath the recording medium during a printing operation, it is not possible to perform capping or purging operations during recording. To prevent clogging in such an arrangement, an ink collection station is disposed at the edge of and outside of the recording medium feed path, and the print head is periodically moved to the collection station where all ink nozzles are fired so as to ensure that they do not become clogged. Since the waste collection stations are smaller in size than a capping/purging mechanism, this arrangement results in a small reduction in size relative to printers having a capping/purging station at the edge of the recording medium path.

However, further reductions in size are desirable. In addition, the periodic movements of the print head to the waste collection station results in an increased printing time which is also not desirable.

SUMMARY OF THE INVENTION

It is therefore an object of the invention to address the foregoing situation.

Specifically, according to one aspect, the invention provides for periodic firings of each print element directly onto the recording medium during the printing operation. So as not to adversely affect the quality of the printed output, the extra firings are carefully controlled. For example, extra firings of light-colored inks (such as, cyan, magenta and yellow inks) are controlled to occur only over black regions of the printed output. Extra firings of the lightest inks (such as yellow and magenta) are controlled to occur over darker colored inks (such as cyan), but only in situations where the overall color of the region can be corrected in spite of the extra firings. Likewise, extra firings of black ink occur only where the overall color of the region in question can be corrected through a manipulation of surrounding colors.

Greater benefits of the invention can be obtained if extra firings are controlled based on input multilevel image data rather than on a binary print data. For example, color correction technology is much more easily applied to multilevel image data rather than to binary print data. Accordingly, in its most preferable form, the invention forms part of a print driver residing in a host computer, which accesses multilevel data corresponding to an original image and which outputs binarized print data for a corresponding printed image. In this case, firings of each individual print element are monitored, and the binarization process is modified so as to ensure that each print element fires frequently enough so as to maintain the free flow of ink therethrough.

Even greater benefits can be obtained when the ink jet printer in question is a so-called "shuttle printer" that is, a printer having more than one print head. In such a situation, at least one conventional technique for prevention of clogging would have required two collection stations, one at each side of the printer, in the case of two print heads, and would further have required outboard collection stations in the case of three or more stations. Without the invention, such printers would have exhibited an unduly large footprint.

Thus, in one aspect the invention obtains binary print data for printout of a print image corresponding to an original image, with the binary print data being printed on an ink jet printer having at least one print head with plural print elements. Bands of multilevel image data corresponding to an original image are accessed, and the multilevel image data is binarized into binary print data, with binarization proceeding based at least in part on previous print data for each print element so as to insert extra firings that maintain the free flow of ink therethrough. Preferably, the firing of each print element is monitored based on the previous binary print data. Each print element may be monitored for frequency of printing (i.e., at least a certain number of drop ejections during a predetermined period of time), or may be monitored based on recency of printing (i.e., how long ago the last droplet was ejected). Based on such monitoring, the binarization process may be modified, but more preferably the multilevel data itself is modified just prior to binarization so as to take into account the monitored firings of each print element.

With the foregoing arrangement, it is possible to ensure that the print elements of a print head do not become clogged, even in the absence of a collection station and/or a capping/purging station. Accordingly, it is possible to reduce the overall footprint of the printer, while at the same time ensuring that print quality does not degrade because of clogged print heads. Moreover, print speed is increased, since it is ordinarily unnecessary to waste movement of the print head to collection or capping stations.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 7($a$) and 7($b$) are views for illustrating how extra firings are added.

DETAILED DESCRIPTION OF THE PREFERRED EMBODIMENT

A detailed description of the preferred embodiment will be given in respect of a representative printer from which the benefits and advantages of the invention can be appreciated. In this case, the representative printer is a printer having two print heads, which is sometimes called a "shuttle printer". As will be appreciated, the invention can also be practiced with a printer having one or more than one heads; however additional benefits arise when the invention is used in connection with a printer having two or more heads.

Figure 1:
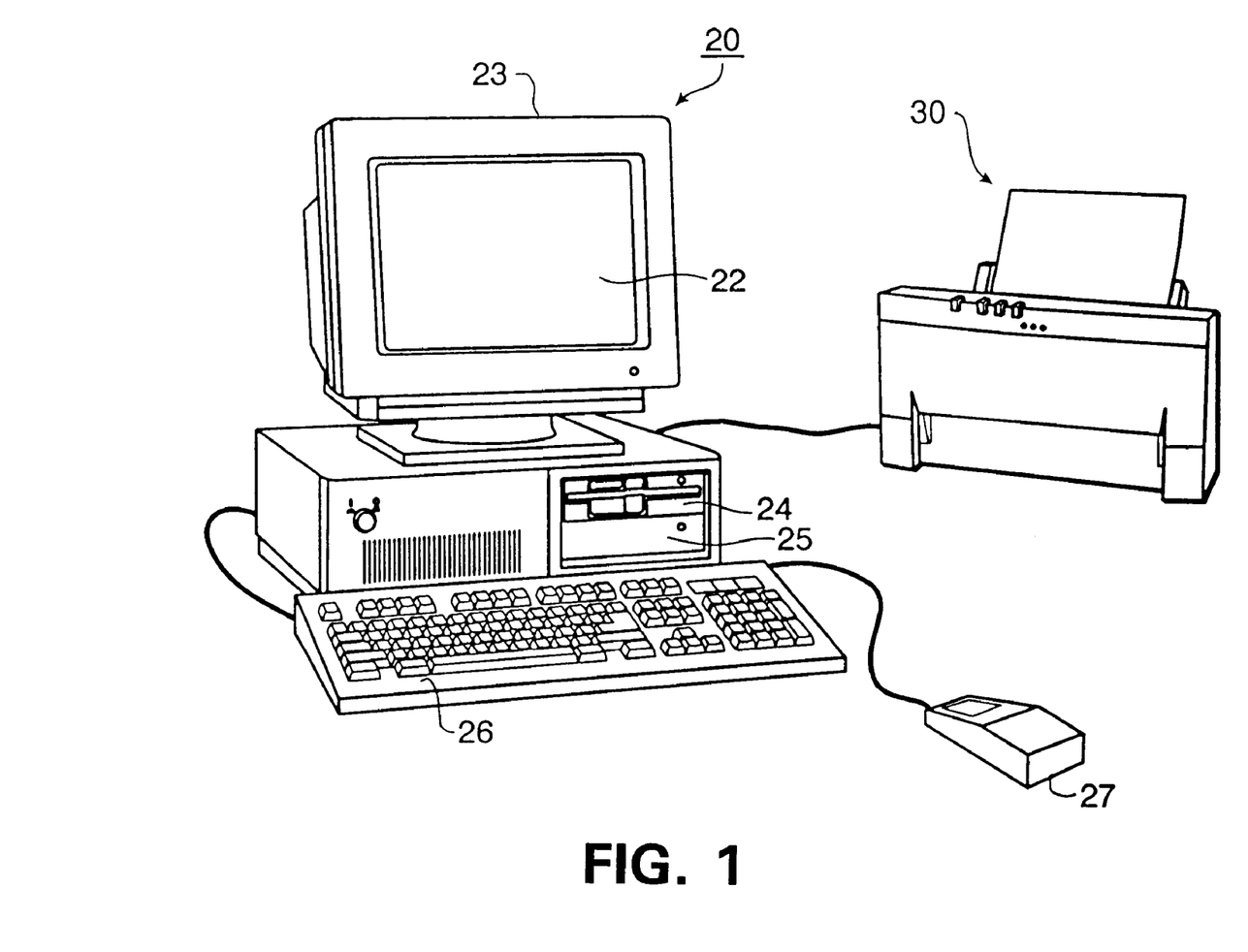
FIG. 1 is a perspective view showing the outward appearance of representative computing equipment which incorporates a print driver according to the invention.

FIG. 1 is a view showing the outward appearance of representative computing equipment which incorporates a print driver according to the invention. Shown in FIG. 1 is computing equipment 20 such as an IBM PC or PC-compatible computer having a windowing operating system such as a Microsoft Windows® operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22.

Other connections may be provided to computing equipment 20, such as a connection or interface to a local area network or to facsimile/modem/telephone interface, both for sending and receiving color image data as well as other files such as files which include program instruction sequences by which computing equipment 20 is operating.

A printer 30 having dual print heads, such as a color bubble jet printer is interfaced to computing equipment 20. Interface between computing equipment 20 and printer 30 may be of any variety, such as an infrared interface or a standard printer interface, but the interface shown here is an IEEE 1284 bi-directional interface or a Centronix interface. Printer 30 includes a pair of bubble jet print heads, with each having plural ink ejection nozzles aligned vertically in groups of each of plural colors, as described more fully below.

In accordance with operator instructions, and under control of the windowing operating system, stored application programs such as graphics application programs, drawing application programs, desktop publishing application programs, and the like, are selectively activated to process and to manipulate data. Also in accordance with operator instructions, and based on those stored application programs, commands are issued to display images on monitor 23 and also to print images appearing on monitor 23 on printer 30.

Figure 2:
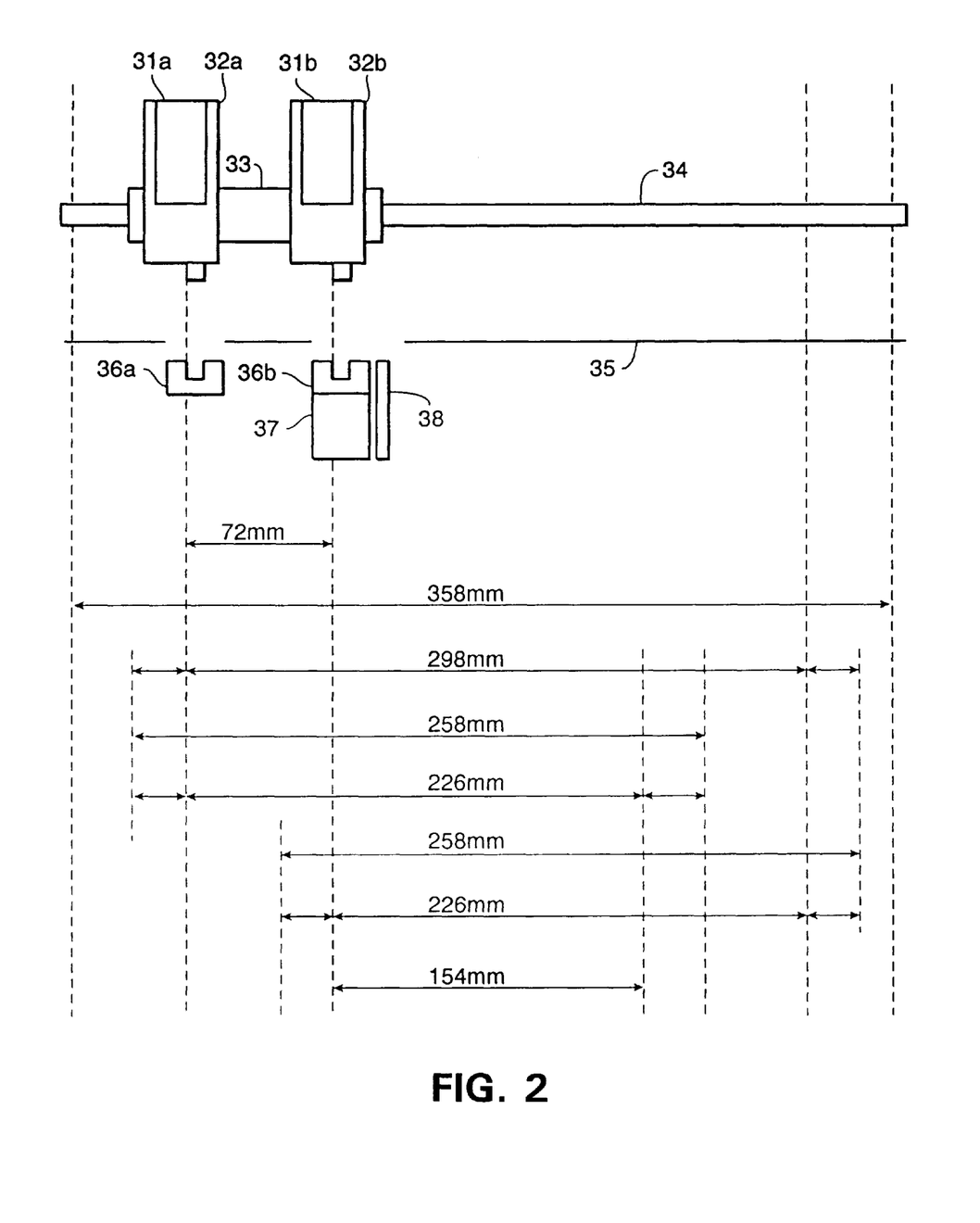
FIG. 2 is a schematic view of a dual head printer.

FIG. 2 is a schematic view of the arrangement of the dual print heads in printer 30. Each of print heads 31$a$ and 31$b$ are mounted on carriage 33 with a fixed separation such as 72 mm. Ink tanks 32$a$ and 32$b$ are respectively provided for each print head, and store different colored inks such as cyan, magenta, yellow and black inks to their respective print head. Such an arrangement allows for independent installation and removal of each tank in each printer head from carriage 33.

Carriage 33 is supported for reciprocal back and forth sliding motion on guide rail 34, and carriage 33 is drive across guide rail 34 by suitable driving means such as a belt or the like. The drive means drives carriage 33, and consequently print heads 31$a$ and 31$b$, in scanning motions across guide rail 34 so as to scan across an unshown printing medium. With this arrangement, print head 31$a$ scans in a left-side portion of the printing medium and has as its printable area a width of 226 mm; whereas print head 31$b$ scans in the left-side portion of the printing medium, and has as its printing area a width of 226 mm.

Capping mechanisms 36$a$ and 36$b$ are respectively provided for the ink jet outlets of each of print heads 31$a$ and 31$b$. The capping mechanisms 36$a$ and 36$b$ are disposed in the feed path of an unshown recording medium, at a position under platen 35 at the home position of carriage 33 so that each ink ejection nozzle can be capped when in the home position. In addition, capping mechanism 36$b$ is additionally provided with pumping mechanism 37, so as to extract ink from the ink ejection nozzles by suction. Since either of print heads 31$a$ or 31$b$ may be positioned over capping mechanism 36$b$, it is ordinarily not necessary to provide a separate pumping mechanism 37 for both capping mechanisms.

Wiper 38 is provided adjacent capping mechanism 36$b$. Wiper 38 moves outward at certain times into the path of the print heads 31$a$ and 31$b$ so as to wipe the ink ejection nozzles of the head as they come in contact therewith.

With the above-described arrangement, a head separation distance of 72 mm between each of heads 31$a$ and 31$b$ corresponds to approximately ¼ of the maximum printable area, which in this case is 298 mm. A central overlap area of 154 mm can be printed on by either of the print heads 31*a* and 31*b*. With this arrangement, A-3 size paper (297 mm×420 mm) can be accommodated easily. In addition, A-5 size paper (148 mm by 210 mm) can also be accommodated easily in the central overlap section. In this case, it is possible to replace one of the two print heads 31*a* and 31*b* with a print head which uses different kinds of ink, such as a print head which uses ink of lesser density than that of the replaced print head. Such an arrangement provides the ability to print with a greater variety of inks such as is desired when printing near-photographic quality images on A-5 size paper.

Figure 3:
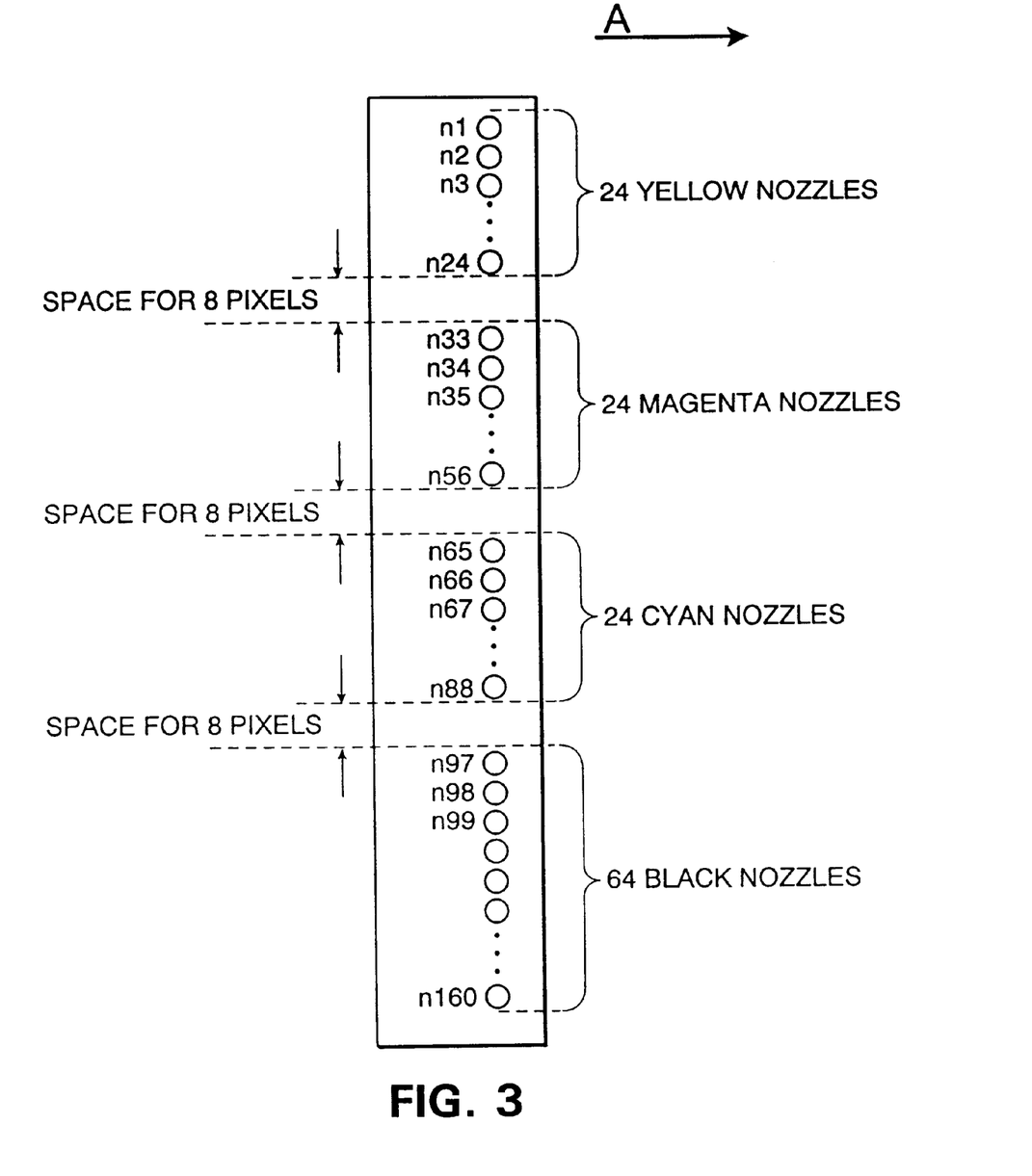
FIG. 3 is view showing print element (or nozzle) arrangement in a print head.

FIG. 3 shows the arrangement of print elements on each of print heads 31*a* and 31*b*. As shown in FIG. 3, the print elements are vertically oriented and arranged in groups for each ink color, with 24 nozzles being provided for yellow ink, 24 nozzles being provided for magenta ink, 24 nozzles being provided for cyan ink, and 64 nozzles being provided for black ink. As seen in FIG. 3, the print elements are arranged vertically, or near-vertically with a slight slant angle that corresponds to formation of a vertical line during rapid sequential firing of the nozzles during movement of the print head in the direction of arrow A. The print head is driven horizontally across the recording medium so as to effect printing in bands, with one band corresponding to the 24 rows of pixels printed during one scan of the print head.

Figure 4:
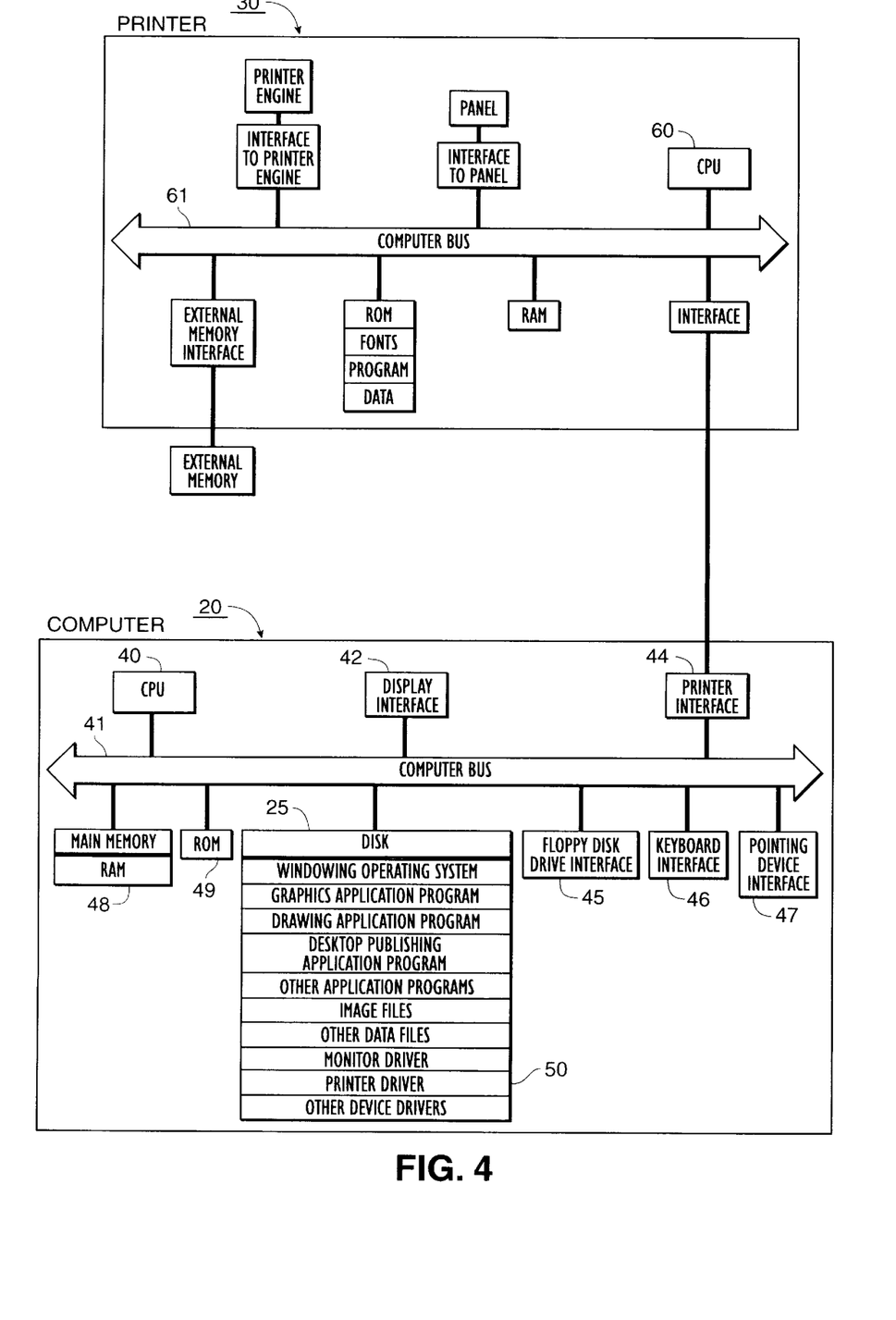
FIG. 4 is a detailed block diagram showing the internal construction of the computer and the printer shown in FIG. 1.

FIG. 4 is a detailed block diagram showing the internal construction of computing equipment 20 and the internal construction of printer 30. As shown in FIG. 4, computing equipment 20 includes a central processing unit (CPU) 40 such as a programmable microprocessor interfaced to computer bus 41. Also interfaced to computer bus 41 is a display interface 42 for interfacing to display 23, a printer interface 44 for interfacing to printer 30, a floppy disk drive interface 45 for interfacing to floppy disk 24, a keyboard interface 46 for interfacing to keyboard 26, and a pointing device 47 interface for interfacing to pointing device 27.

Main memory 48 such as random access memory (RAM) interfaces to computer bus 41 so as to provide CPU 40 with access to memory storage. In particular, when executing stored application program instruction sequences such as those associated with application programs stored on disk 25, CPU 40 loads those application instruction sequences from disk 25 (or whichever other storage media such as media accessed via a network or a floppy disk drive 24) into main memory 48 and executes those stored program instruction sequences out of the main memory.

Read only memory (ROM) 49 is provided for storing invariant instruction sequences, such as start-up instruction sequences or basic input/output operating system (BIOS) sequences for operation of keyboard 26.

As shown in FIG. 4, and as previously mentioned, fixed disk 25 stores program instruction sequences for the windowing operating system and for various application programs such as graphics application programs, drawing application programs, desktop publishing application programs, and the like. In addition, fixed disk 25 also stores color image files such as might be displayed on monitor 23 or printed on printer 30 under control of a designated application program. Fixed disk 25 also stores a color monitor driver which controls how RGB color primary values are provided to display interface 42, and a print driver 50 which is a print driver for controlling how CMYK color component values are derived from RGB color primary values and provided to printer interface 44 for print out by printer 30 in a way that prevents clogging of the print elements, all according to the invention.

Other device drivers are also stored on fixed disk 25, for providing appropriate signals to various devices, such as network devices, facsimile devices, and the like, connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media such as CD-ROM on which a copy of a printer driver according to the invention is stored. The user would then install the printer driver 50 onto floppy disk 25 through well-known techniques by which the printer driver is copied into disk 25. At the same time, it is also possible for the user, via an unshown modem interface or via an unshown network, to download a printer driver according to the invention, such as by downloading from a file server or from a computerized bulletin board.

Reverting to FIG. 4, printer 30 includes a CPU 60, such as a V853 single chip microprocessor, connected to computer bus 61. Also connected to computer bus 61 are RAM 62, ROM 63, external memory interface 64, interface 65 to a print engine, interface 66 to a panel, and interface 67 to computer 20. RAM 62 is comprised of working storage for printer 30, and in particular includes a print data buffer area as described more fully below. ROM 63 is comprised by a font ROM for storing font data, a program ROM to store program instruction sequences used to control printer 30, and invariant data such as printer model number and the like. External memory interface 64 interfaces to external memory cartridges such as cartridge 70 that provide additional fonts for printer 30, or provide additional random access memory. Interface 65 interfaces to a print engine 71 including interfaces to printer heads illustrated in FIG. 7, an interface to the drive means for carriage 33, an interface to capping mechanisms 36*a* and 36*b* and to pump 37, and other unshown interfaces such as interfaces to document feed sections and interfaces to printer nozzle controls. Interface 66 to a panel includes an interface to panel 72, comprised, for example, by an LCD display for displaying status of the printer, LEDs for indicating on-line and off-line or error conditions, and various control buttons for setting and otherwise interfacing with printer 30. Interface 67 includes a complementary interface to printer interface 44 of computer 20.

Although FIG. 4 illustrates the individual components of printer 30 as separate and distinct from one another, it is preferable that at least some of those components are combined. For example, it is preferable to combine external memory interface 64, interface 65 to the print engine, interface 66 to the panel, and interface 67 into a single gate array. Most preferably, the aforementioned gate array is further combined with CPU 60, RAM 62 and ROM 63 into a so-called four-in-one chip, which eliminates the need to provide leads to a separate computer bus and lessens the number of interconnections needed so as to fabricate a control portion for printer 30.

Figure 5:
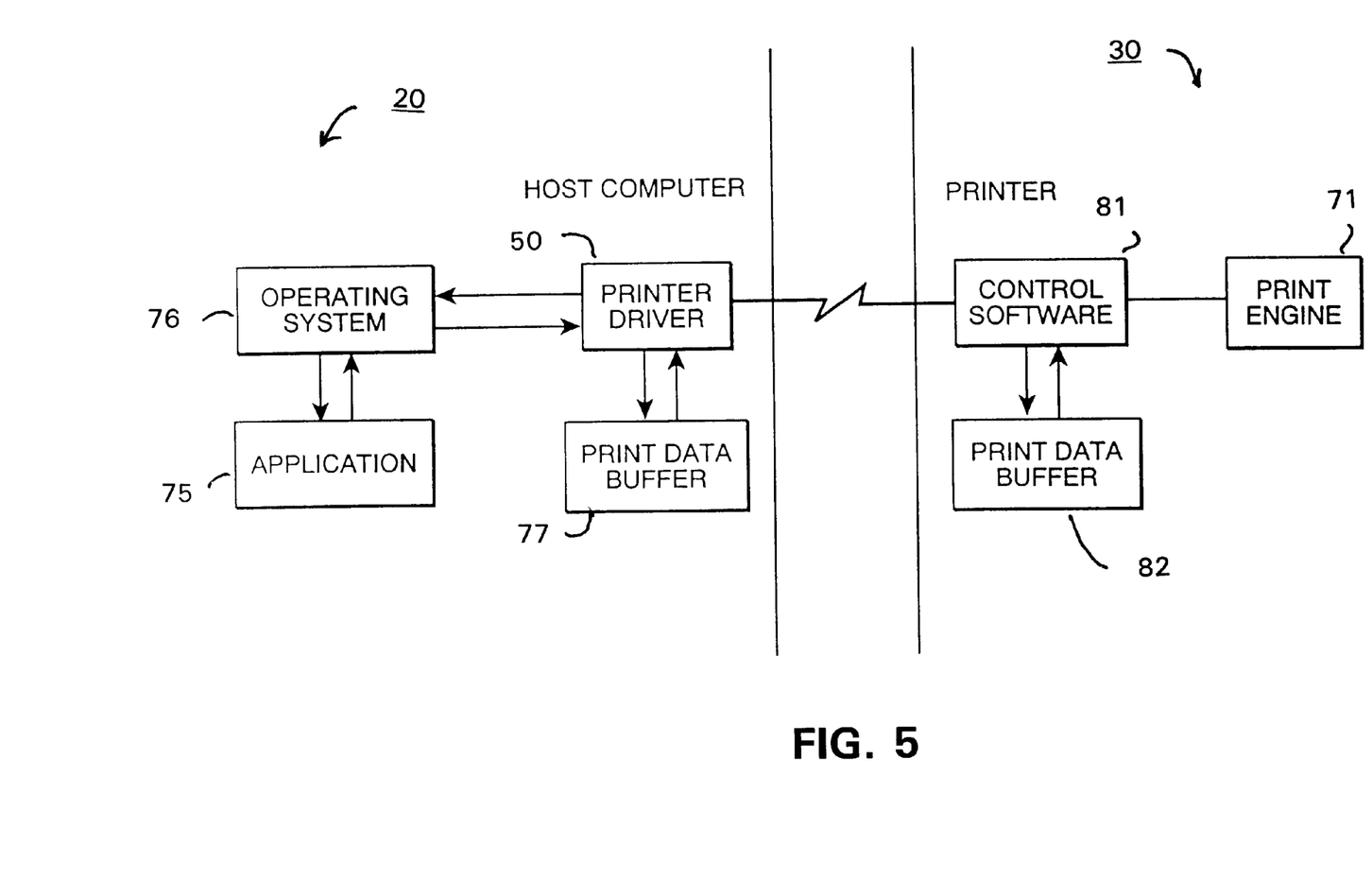
FIG. 5 is a functional block diagram showing functional interconnection of the computer and the printer shown in FIG. 1.

FIG. 5 is a high-level functional block diagram illustrating how computer 20 interacts with printer 30 in the practice of the invention. As shown in FIG. 5, in response to a printing instruction issued from application program 75, such as an image processing application stored on disk 25, the windowing operating system 76 issues graphics device interface calls to printer driver 50. In accordance with the invention, printer driver 50 derives print data corresponding to the print instruction from application 75, and stores the print data in print data buffer 77. Thereafter, and again in accordance with the invention, print driver 50 obtains print data from print data buffer 77 and transmits the print data to printer 30 for printout thereby.

At the receiving end, printer 30 through use of control software 81 comprised by the program stored in ROM 63 receives the print data from print driver 50 and stores it in a print data buffer 82. Print data buffer 82 resides in RAM 62. Thereafter, control software 81 retrieves the stored print data from print data buffer 82, processes it as described below such as by decompression, and transmits it to print engine 71 for printout thereby.

Figure 6:
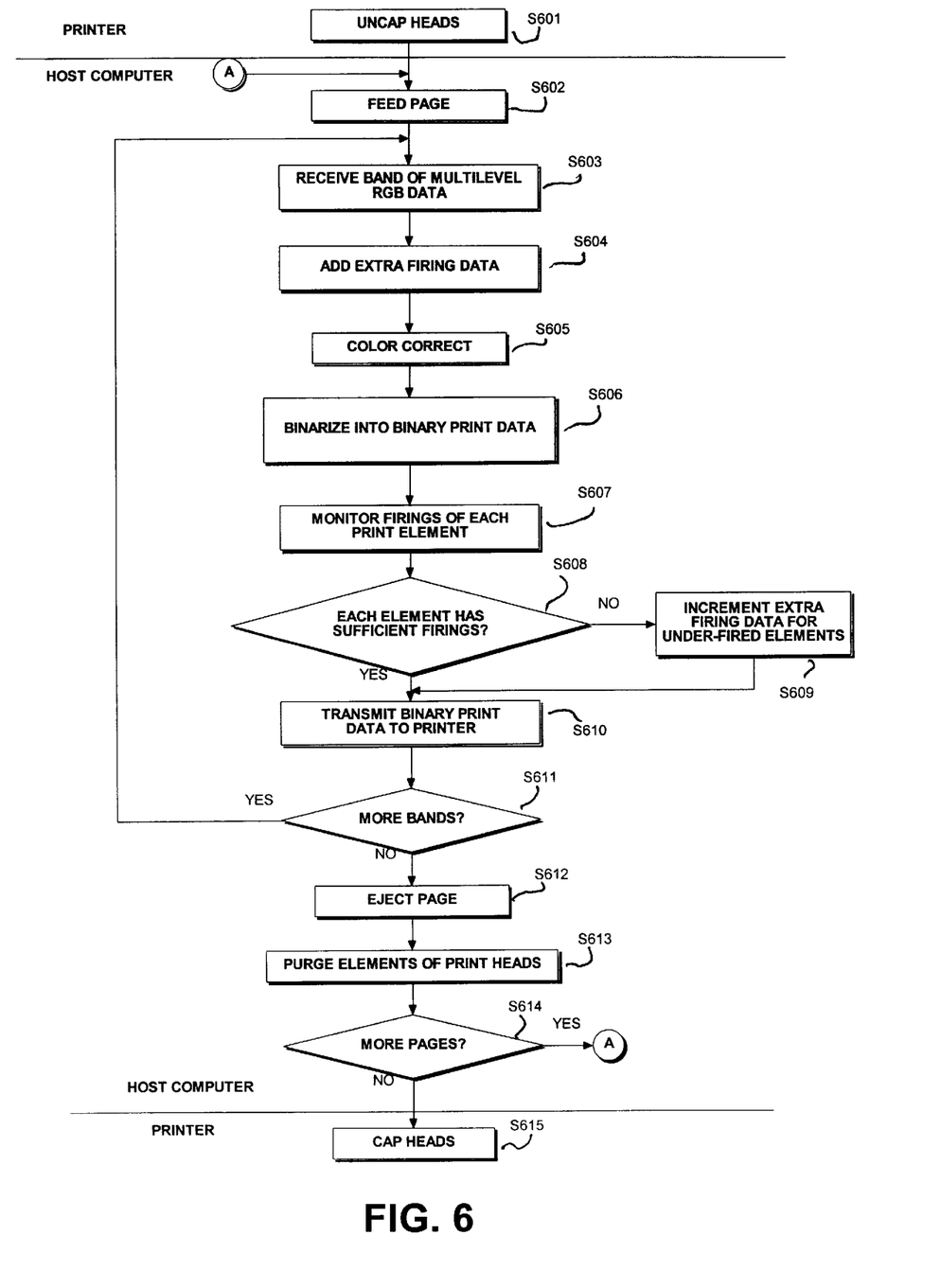
FIG. 6 is a flow diagram for explaining the process steps and code for a print driver according to the invention.

FIG. 6 is a flow diagram showing process steps for a printer driver in accordance with the invention. Process steps S602 through S614 are stored as code on a computer readable medium for execution by CPU 40 in host computer 20.

Generally speaking, the process steps shown in FIG. 6 are a print driver executable in a host computer so as to obtain binary print data for printout of a print image corresponding to an original image, with the binary print data being printed by an ink jet printer having at least one print head with plural print elements thereon. Multilevel data corresponding to a band in the original image are accessed, and the multilevel data is binarized into binary print data for each of the plural print elements of the print head. Binarization proceeds such that for each print element, the binary data is based at least in part on previous binary print data for that print element so as to insert extra firings to maintain the free flow of ink through the print element. Frequency of firing for each print element is monitored, with binarization proceeding in accordance with the frequency monitoring, or with binarization proceeding based on modifications to the multilevel data to add firings based on the monitored frequency.

In more detail, in step S601 which is performed by the printer, print heads 31a and 31b are uncapped in preparation for printing. With the capping mechanisms 36a and 36b safely below the level of platen 35, step S602 issues an instruction to cause the printer to feed a recording medium into position on the surface of the platen for print thereon by the print heads.

In step S603, print driver 50 receives multilevel RGB data corresponding to a band of print information in an original image. The multilevel data corresponds to plural red, green and blue color planes for the original image, and generally is received through graphic device interface commands from a windowing graphical device interface (GDI) environment from operating system 76. Each pixel of the original image has corresponding pixel data in each of three color planes. Specifically, in a case where the pixels of the original image are arranged in a two-dimensional raster array of pixels so as to form a rasterized bitmap image, a separate R, G and B color plane is provided for each pixel. Each plane stores pixel data for its respective color component in an 8-bit byte. Thus, the color of each pixel in the original image is represented by 24 bits of pixel data, and is commonly referred to as 24-bit or 16-million color data (i.e., "multilevel data").

Step S604 adds extra firing data to the multilevel image data. The extra firing data is based on previous binary print data, and is specifically tailored so as to ensure that each print element ejects ink droplets with at least a certain predetermined frequency, or at least once within a predetermined time interval (i.e., based on recency). Preferably, step S604 in which extra firing data is added is performed on multilevel image data corresponding to the original image, rather than on binary print data corresponding to the printed image. This is because multilevel image data allows a finer degree of image correction than would be allowed by binary print data. This extra degree of fineness allows even finer control over where extra firings are inserted, as well as finer control as to how to correct for color changes caused by the insertion of extra firing data.

Figure 7A:
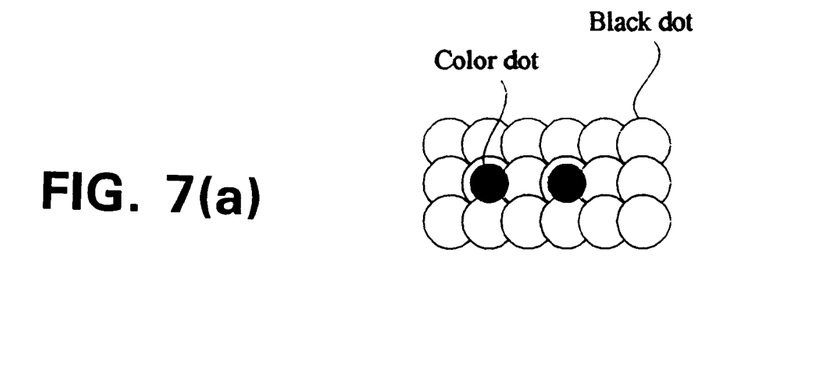
Figure 7B:
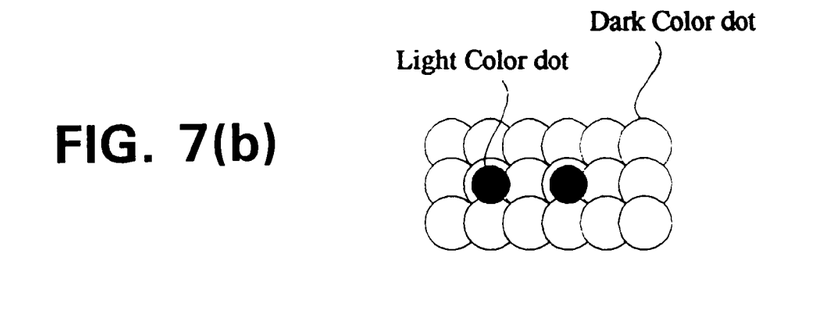

FIGS. 7(a) and 7(b) are diagrams for showing how extra firing data is added so as to cause the least possible effect on the printed image. Generally speaking, extra firings are added so that (1) extra firings (if needed) are added for any of the colored inks (i.e., cyan, magenta or yellow) onto black regions of the image, (2) extra firings (if needed) for a lighter-colored ink (i.e., yellow) are added onto darker-colored inks (cyan), or (3) extra firings (if needed) for black ink are added at inconspicuous locations of the image where appropriate color corrections can be made. Thus, for example, as shown in FIG. 7(a), extra firings for a colored ink are added into regions comprised solely of black ink. Such firings cause very little color shift, since they are almost completely masked by the high contrast of the black ink. They can be masked even further by extra firing of all three colored inks, even though only one such ink is actually needed, so as to cause overlapped formation of cyan, magenta and yellow, to thereby form a pseudo-black color.

Likewise, in FIG. 7(b), extra firings for a lighter colored ink are added to regions composed of darker colored ink. Color shift may result from such extra firings, and may in fact be noticeable by a viewer, but the effect of such color shifts can be minimized by color corrections to the surrounding area as described more fully herein below.

Figure 8:
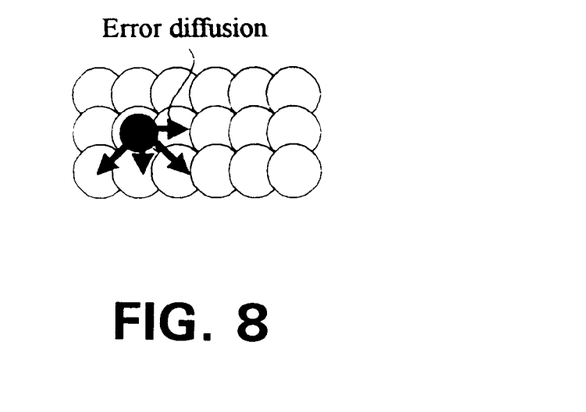
FIG. 8 is a view for illustrating how to correct for color shift caused by extra firings.

Reverting to FIG. 6, step S605 corrects for any color shift caused by added extra firing data. Specifically, when adding firing data corresponding to a lighter color ink onto a darker colored region, a certain amount of color shift may be observed. The effects of such color shift can be minimized through a variety of color correction techniques, including well-known error diffusion techniques. Such a technique is illustrated in FIG. 8, which illustrates the process of diffusing error caused by the addition of extra firing data into surrounding pixels of the printed image.

Step S606 binarizes the multilevel data, which has been modified with the extra firing data of step S604 and color correction of step S605. Any suitable binarization technique may be used, such as dither processing, error diffusion, stochastic sampling, and the like. The binarized data is stored in print buffer 77 for transmission to printer 30.

Figure 9:
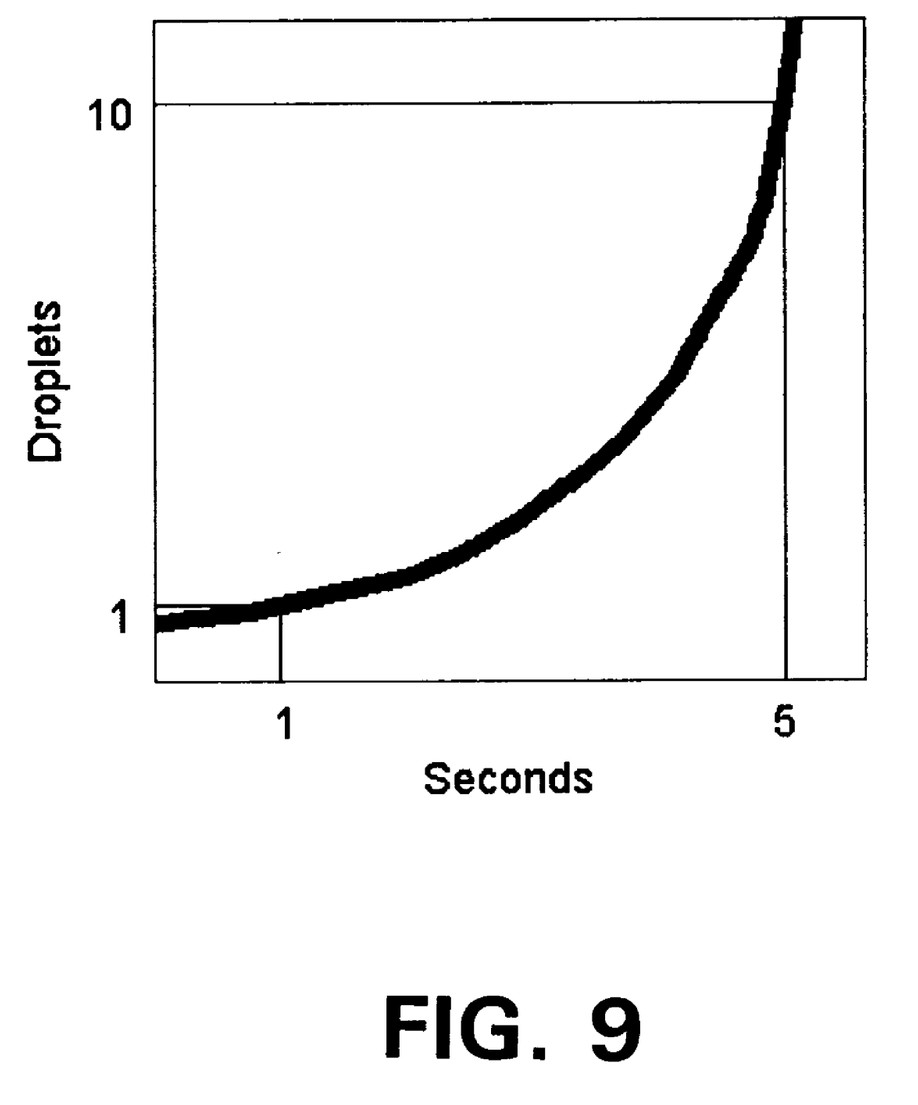
FIG. 9 is a graph for explaining the minimum number of firings needed to avoid clogging.

Step S607 monitors the firing of each print element based on the data inserted into print buffer 77. Specifically, the data for each print element is monitored so as to ensure that each print element fires frequently enough to ensure a free flow of ink therethrough, and to prevent clogging. FIG. 9 shows an empirically-derived graph indicating the number of drops needed to avoid clogging within a predetermined amount of seconds. Generally speaking, it can be seen that at least ten drops need to be ejected from each print element within a five second interval, lest the print element become clogged. Accordingly, monitoring in step S607 proceeds by determining whether the needed number of drops to avoid clogging have been ejected within the last period of time (i.e., frequency monitoring). Alternatively, referring to FIG. 9, it is also seen that to avoid clogging, at least one drop needs to be ejected every second. Thus, monitoring in step S607 can also proceed by monitoring recency of print data, that is, to ensure that at least one drop has been ejected within the last second.

Step S608 determines whether each print element has had sufficient firings to avoid clogging. If there have not been sufficient firings for each and every element of the print nozzle, flow branches to step S609 so as to increment the extra firing data (used in the next iterative execution of step S604) for all print elements that need extra firings.

In either event, flow advances to step S610 in which the binary print data in print buffer 77 is transmitted to printer 30. Preferably, transmission is "on demand", meaning that printer 30 advises host computer 20 when additional print data should be transmitted. Such an arrangement provides printer 30 with increased degree of manageability over its own print buffer, and thereby can decrease the size of the buffer so required. Under these circumstances, it may also be preferable for print driver 50 to pre-process the print data in buffer 77, such as by shifting the data in correspondence to vertical offset between groups of print elements on the print head, and by conversion of raster format print data (i.e., row data) into column format print data. Other techniques for reducing the size of the print buffer needed by printer 30, and otherwise enhancing the appearance of the printed image, are described in Japanese published applications laid-open numbers 08-142349 (Jun. 4, 1996), 08-150736 (Jun. 11, 1996), 08-150737 (Jun. 11, 1996) and 08-157035 (Jun. 11, 1996), and in U.S. application Ser. No. 08/557,568, filed Nov. 14, 1995, "Recording System For Transferring Offset Data To Be Recorded", the contents of which are incorporated herein by reference as if set forth here in full.

Flow next advances to step S611 which determines whether any more bands of the original image need processing. If more bands exist, then flow returns to step S603 to iterate through a repetition of steps S603 through S610. On the other hand, if there are no further bands to be processed, then step S612 issues an instruction to eject the recording medium from printer 30, and step S613 sequentially returns print heads 31a and 31b to purging station 36b to purge the print elements and to ensure continuously free flow of ink through the print elements. Step S614 determines whether any more pages of print information need to be processed by print driver 50. If there are no more pages, flow advances to step S615 in which the printer causes print heads 31a and 31b to be capped by capping mechanisms 36a and 36b, respectively. On the other hand, if additional pages of information are to be printed, then flow returns to step S602 in which a fresh sheet of a recording medium is fed in printer 30.

Although the invention has been described herein as if extra firings were the only technique used to prevent clogging of the print head, the invention can be combined with conventional techniques to avoid clogging. Thus, with the dual print head illustrated above, it is also possible to position waste collection receptacles at the lateral edges outside the path of the recording medium, as illustrated at 85 in FIG. 10, to allow for firings off the medium. This technique can prove especially useful in avoiding clogging of the black print elements, for which color shift correction for extra firings is more difficult. In addition, since during color printing only 24 out of the 64 available black print elements are used, the availability of laterally disposed waste collection receptacles ensures that the remaining 40 print elements will not become clogged during printout of a color image.

Figure 10:
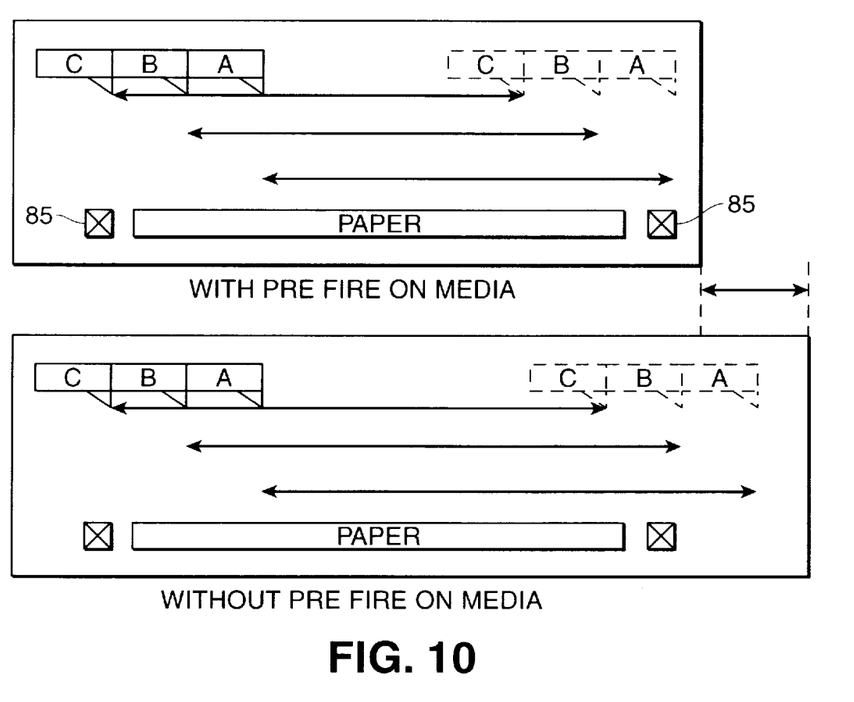
FIGS. 10 and 11 are schematic cross sections of printers used for explaining advantages of the invention.
Figure 11:
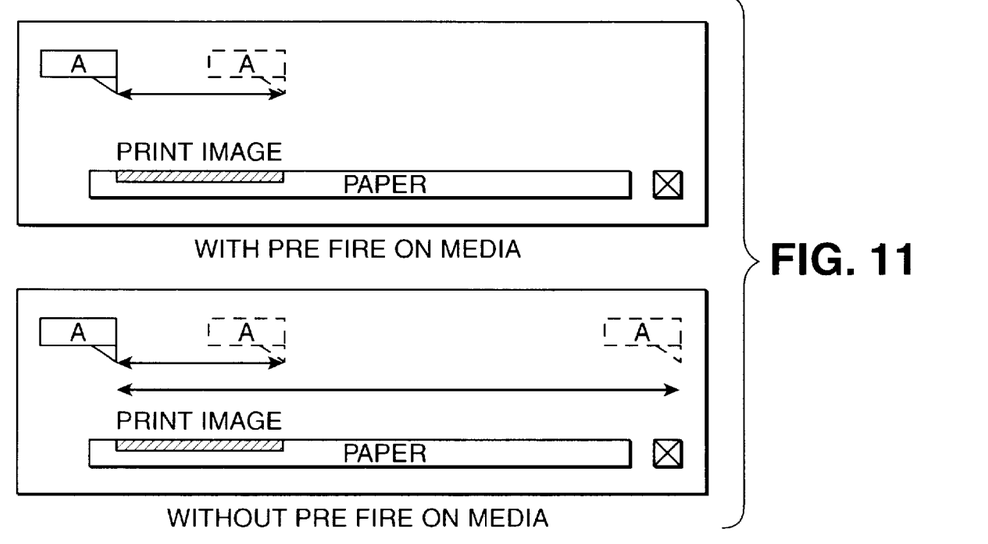

FIGS. 10 and 11 illustrate advantages of the invention, with FIG. 10 illustrating the decreased printer width available from the invention, and with FIG. 11 illustrating the decreased printout time obtainable by the invention. Specifically, FIG. 10 schematically illustrates a printer having three heads and laterally-disposed waste collection receptacles 85 outside the feed path of the recording medium. Without extra firings according to the invention, it is necessary to increase the width of the printer so as to be able to give access to the waste collection receptacles to each of the three print heads. On the other hand, using extra firings according to the invention, not all print heads need access to the waste collection receptacle, thereby permitting a reduction in printer width.

FIG. 11 illustrates the print reduction time available according to the invention, even when the invention is used with a printer having only a single print head. Specifically, since the print head can spend nearly all available time printing the image, and need not travel outside the recording medium for extra firings into a waste collection receptacle, printout time is reduced.

It is emphasized that several changes may be applied to the above-described system without departing from the teaching of the invention. In particular, it is intended that all matter contained in the present disclosure, or shown in the accompanying drawings, shall be interpreted as illustrative and not as limiting. Rather, the scope of the invention is meant to be determined based on the appended claims.

What is claimed is:

1. A method for obtaining binary print data for printout of a print image corresponding to an original image, the binary print data for printout by an ink jet printer having at least one print head with plural print elements thereon, comprising:
    modifying multilevel data corresponding to the original image; and
    binarizing the modified multilevel data into binary print data for each of the plural print elements of the print head,
    wherein modification of the multilevel data includes modification such that the binary print data for each print element is binarized based at least in part on previous binary print data for that print element so as to insert extra firings to maintain free flow of ink therethrough.

2. A method according to claim 1, further comprising the step of transmitting the binary print data to the printer.

3. A method according to claim 1, wherein binarization is based on frequency of firing for each print element of the print head.

4. A method according to claim 1, wherein binarization is based on recency of firing for each print element of the print head.

5. A method according to claim 1, wherein said modifying step comprises the step of adding extra firing data to the multilevel data.

6. A method according to claim 5, further comprising the step of color-correcting surrounding binary print data based on the added extra firing data.

7. A method according to claim 1, further comprising the step of moving the print head to a waste collection receptacle for extra firing off the recording medium.

8. A method for obtaining binary print data for printout of a print image corresponding to an original image, the binary print data for printout by an ink jet printer having at least one print head with plural print elements thereon, comprising:
    accessing multilevel data corresponding to a band in the original image;
    modifying the multilevel data based on frequency and/or recency of firing of each print element; and
    binarizing the modified multilevel data into binary print data for each of the plural print elements of the print head.

9. A method according to claim 8, further comprising the step of transmitting the binary print data to the printer.

10. A method according to claim 8, wherein said modifying step modifies by adding extra firings based on frequency and/or recency of firing for each print element.

11. A method according to claim 10, further comprising the step of color-correcting surrounding binary print data based on the added extra firing data.

12. A method according to claim 8, further comprising the step of moving the print head to a waste collection receptacle for extra firing off the recording medium.

13. A method for obtaining binary print data for printout of a print image corresponding to an original image, the binary print data for printout by an ink jet printer having at least one print head with plural print elements thereon, comprising:

accessing multilevel data corresponding to a band in the original image;

monitoring firing of each print element based on previous binary print data;

modifying the multilevel data based on the monitored firing; and binarizing the modified multilevel data in to binary print data for each of the plural print elements of the print head, such that binarization is based at least in part on the monitored firing of each print element.

14. A method according to claim 13, further comprising the step of transmitting the binary print data to the printer.

15. A method according to claim 13, wherein said monitoring step monitors frequency of firing of each print element.

16. A method according to claim 13, wherein said monitoring step monitors recency of firing of each print element.

17. A method according to claim 13, wherein said modifying step comprises the step of adding extra firing data to the multilevel data.

18. A method according to claim 17, further comprising the step of color-correcting surrounding binary print data based on the added extra firing data.

19. A method according to claim 13, further comprising the step of moving the print head to a waste collection receptacle for extra firing off the recording medium.

20. A print driver stored in a computer readable medium executable in a host computer so as to obtain binary print data for printout of a print image corresponding to an original image, the binary print data for printout by an ink jet printer having at least one print head with plural print elements thereon, said print driver comprising:

code to modify multilevel data corresponding to a band in the original image; and code to binarize the modified multilevel data into binary print data for each of the plural print elements of the print head, wherein modification of the multilevel data includes modification such that the binary print data for each print element is binarized based at least in part on previous binary print data for that print element so as to insert extra firings to maintain free flow of ink therethrough.

21. A print driver according to claim 20, further comprising code to transmit the binary print data to the printer.

22. A print driver according to claim 20, wherein binarization is based on frequency of firing for each print element of the print head.

23. A print driver according to claim 20, wherein binarization is based on recency of firing for each print element of the print head.

24. A print driver according to claim 20, wherein said code to modify comprises code to add extra firing data to the multilevel data.

25. A print driver according to claim 24, further comprising code to color-correct surrounding binary print data based on the added extra firing data.

26. A print driver according to claim 20, further comprising code to move the print head to a waste collection receptacle for extra firing off the recording medium.

27. A print driver stored in a computer readable medium executable in a host computer for obtaining binary print data for printout of a print image corresponding to an original image, the binary print data for printout by an ink jet printer having at least one print head with plural print elements thereon, comprising:

code to access multilevel data corresponding to a band in the original image;

code to modify the multilevel data based on frequency and/or recency of firing of each print element; and code to binarize the modified multilevel data into binary print data for each of the plural print elements of the print head.

28. A print driver according to claim 27, further comprising code to transmit the binary print data to the printer.

29. A print driver according to claim 27, wherein said code to modify modifies by adding extra firings based on frequency and/or recency of firing for each print element.

30. A print driver according to claim 29, further comprising code to color-correct surrounding binary print data based on the added extra firing data.

31. A print driver according to claim 27, further comprising code to move the print head to a waste collection receptacle for extra firing off the recording medium.

32. A print driver stored in a computer readable medium executable in a host computer for obtaining binary print data for printout of a print image corresponding to an original image, the binary print data for printout by an ink jet printer having at least one print head with plural print elements thereon, comprising:

code to access multilevel data corresponding to a band in the original image;

code to monitor firing of each print element based on previous binary print data;

code to modify the multilevel data based on the monitored firing; and code to binarize the modified multilevel data in to binary print data for each of the plural print elements of the print head, such that binarization is based at least in part on the monitored firing of each print element.

33. A print driver according to claim 32, further comprising code to transmit the binary print data to the printer.

34. A print driver according to claim 32, wherein said code to monitor monitors frequency of firing of each print element.

35. A print driver according to claim 32, wherein said code to monitor monitors recency of firing of each print element.

36. A print driver according to claim 32, wherein said code to modify comprises code to add extra firing data to the multilevel data.

37. A print driver according to claim 36, further comprising code to color-correct surrounding binary print data based on the added extra firing data.

38. A print driver according to claim 32, further comprising code to move the print head to a waste collection receptacle for extra firing off the recording medium.

39. A computer readable medium on which is stored code for a print driver executable in host computer the print driver to obtain binary print data for printout of a print image corresponding to an original image, the binary print data for printout by an ink jet printer having at least one print head with plural print elements thereon, the code comprising:

code to modify multilevel data corresponding to the original image; and     code to binarize the modified multilevel data into binary print data for each of the plural print elements of the print head,     wherein modification of the multilevel data includes modification such that the binary print data for each print element is binarized based at least in part on previous binary print data for that print element so as to insert extra firings to maintain free flow of ink therethrough.

40. A computer readable medium according to claim 39, further comprising code to transmit the binary print data to the printer.

41. A computer readable medium according to claim 39, wherein binarization is based on frequency of firing for each print element of the print head.

42. A computer readable medium according to claim 39, wherein binarization is based on recency of firing for each print element of the print head.

43. A computer readable medium according to claim 39, wherein said code to modify comprises code to add extra firing data to the multilevel data.

44. A computer readable medium according to claim 43, further comprising code to color-correct surrounding binary print data based on the added extra firing data.

45. A computer readable medium according to claim 39, further comprising code to move the print head to a waste collection receptacle for extra firing off the recording medium.

46. A computer readable medium on which is stored code for a print driver executable in a host computer for obtaining binary print data for printout of a print image corresponding to an original image, the binary print data for printout by an ink jet printer having at least one print head with plural print elements thereon, the code comprising:

code to access multilevel data corresponding to a band in the original image;

code to modify the multilevel data based on frequency and/or recency of firing of each print element; and     code to binarize the modified multilevel data into binary print data for each of the plural print elements of the print head.

47. A computer readable medium according to claim 46, further comprising code to transmit the binary print data to the printer.

48. A computer readable medium according to claim 46, wherein said code to modify modifies by adding extra firings based on frequency and/or recency of firing for each print element.

49. A computer readable medium according to claim 48, further comprising code to color-correct surrounding binary print data based on the added extra firing data.

50. A computer readable medium according to claim 46, further comprising code to move the print head to a waste collection receptacle for extra firing off the recording medium.

51. A computer readable medium on which is stored code for a print driver executable in a host computer for obtaining binary print data for printout of a print image corresponding to an original image, the binary print data for printout by an ink jet printer having at least one print head with plural print elements thereon, the code comprising:

code to access multilevel data corresponding to a band in the original image;

code to monitor firing of each print element based on previous binary print data;

code to modify the multilevel data based on the monitored firing; and     code to binarize the modified multilevel data in to binary print data for each of the plural print elements of the print head, such that binarization is based at least in part on the monitored firing of each print element.

52. A computer readable medium according to claim 51, further comprising code to transmit the binary print data to the printer.

53. A computer readable medium according to claim 51, wherein said code to monitor monitors frequency of firing of each print element.

54. A computer readable medium according to claim 51, wherein said code to monitor monitors recency of firing of each print element.

55. A computer readable medium according to claim 51, wherein said code to modify comprises code to add extra firing data to the multilevel data.

56. A computer readable medium according to claim 55, further comprising code to color-correct surrounding binary print data based on the added extra firing data.

57. A computer readable medium according to claim 51, further comprising code to move the print head to a waste collection receptacle for extra firing off the recording medium.

58. A printing system comprising:

an ink jet printer having at least one print head with plural elements thereon, said ink jet printer including a print interface to receive binary print data for printout thereby; and     a host computer including a print driver executable thereon to modify multilevel data corresponding to an original image, and to binarize the modified multilevel data into binary print data for each of the plural elements of said print head, and to cause the binary print data to be transmitted to said interface;

wherein modification of the multilevel data includes modification such that the binary print data for each print element is binarized based at least in part on previous binary print data for such print element so as to insert extra firings to maintain free flow of ink therethrough.

59. A printing system according to claim 58, wherein binarization is based on frequency of firing for each print element of the print head.

60. A printing system according to claim 58, wherein binarization is based on recency of firing for each print element of the print head.

61. A printing system according to claim 58, wherein said print driver is adapted to add extra firing data to the multilevel data.

62. A printing system according to claim 58, wherein said print driver is adapted to color-correct surrounding binary print data based on the added extra firing data.

63. A printing system according to claim 58, wherein said ink jet printer includes at least one waste collection receptacle outside a feed path of a recording medium, and wherein said print driver is adapted to move the print head to said waste collection receptacle for extra firing off the recording medium.

64. A printing system comprising:

an ink jet printer having at least one print head with plural elements thereon, said ink jet printer including a print interface to receive binary print data for printout thereby; and a host computer including a print driver executable thereon to access multilevel data corresponding to a band in the original image, to modify the multilevel data based on frequency and/or recency of firing of each print element, and to binarize the modified multilevel data into binary print data for each of the plural print elements of the print head and to cause the multilevel data to cause the binary print data to be transmitted to said interface.

65. A printing system according to claim 64, wherein said print driver modifies the multilevel data by adding extra firings based on frequency and/or recency of firing for each print element.

66. A printing system according to claim 65, wherein said print driver is adapted to color-correct surrounding binary print data based on the added extra firing data.

67. A printing system according to claim 64, wherein said ink jet printer includes at least one waste collection receptacle outside a feed path of a recording medium, and wherein said print driver is adapted to move the print head to said waste collection receptacle for extra firing off the recording medium.

68. A printing system comprising:

an ink jet printer having at least one print head with plural elements thereon, said ink jet printer including a print interface to receive binary print data for printout thereby; and a host computer including a print driver executable thereon to access multilevel data corresponding to a band in the original image, to monitor firing of each print element based on previous binary print data, to modify the multilevel data based on the monitored firing, and to binarize the modified multilevel data in to binary print data for each of the plural print elements of the print head, and to cause the binary print data to be transmitted to said interface;

wherein binarization is based at least in part on the monitored firing of each print element.

69. A printing system according to claim 68, wherein said print driver monitors frequency of firing of each print element.

70. A printing system according to claim 68, wherein said print driver monitors recency of firing of each print element.

71. A printing system according to claim 68, wherein said print driver is adapted to add extra firing data to the multilevel data.

72. A printing system according to claim 71, wherein said print driver is adapted to color-correct surrounding binary print data based on the added extra firing data.

73. A printing system according to claim 68, wherein said ink jet printer includes at least one waste collection receptacle outside a feed path of a recording medium, and wherein said print driver is adapted to move the print head to said waste collection receptacle for extra firing off the recording medium.

* * * * *

UNITED STATES PATENT AND TRADEMARK OFFICE
CERTIFICATE OF CORRECTION

PATENT NO. : 6,166,828
DATED : December 26, 2000
INVENTOR(S) : Yamada et al.

It is certified that error appears in the above-identified patent and that said Letters Patent is hereby corrected as shown below:

Column 2,
Line 1, "results" should read -- result --.

Column 4,
Line 37, "drive" should read -- driven --.

Column 12,
Line 66, "in host computer" should read -- in a host computer --.

Signed and Sealed this

Thirteenth Day of November, 2001

Attest:

*Nicholas P. Godici*

NICHOLAS P. GODICI
*Acting Director of the United States Patent and Trademark Office*

*Attesting Officer*